United States Patent
Ramadoss et al.

(10) Patent No.: US 10,261,570 B2
(45) Date of Patent: Apr. 16, 2019

(54) MANAGING GRAPHICS POWER CONSUMPTION AND PERFORMANCE

(71) Applicant: Intel Corporation, Santa Clara, CA (US)

(72) Inventors: Murali Ramadoss, Folsom, CA (US); Sathyanarayanan Srinivasan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 14/091,413

(22) Filed: Nov. 27, 2013

(65) Prior Publication Data

US 2015/0149805 A1  May 28, 2015

(51) Int. Cl.
*G06F 1/32* (2019.01)
*G06F 1/3287* (2019.01)
*G06F 1/3206* (2019.01)

(52) U.S. Cl.
CPC .......... *G06F 1/3287* (2013.01); *G06F 1/3206* (2013.01); *Y02D 10/171* (2018.01)

(58) Field of Classification Search
CPC .................. G06F 1/3287; G06F 1/3203
See application file for complete search history.

(56) References Cited

U.S. PATENT DOCUMENTS

| | | | |
|---|---|---|---|
| 7,802,118 B1* | 9/2010 | Abdalla | G06F 1/3237 713/300 |
| 8,923,030 B2 | 12/2014 | Sandri et al. | |
| 2010/0088453 A1* | 4/2010 | Solki | G06F 3/14 710/313 |
| 2012/0191988 A1* | 7/2012 | Li | G06F 1/26 713/300 |
| 2013/0063450 A1* | 3/2013 | Kabawala | G06F 9/5094 345/502 |
| 2014/0035938 A1* | 2/2014 | Wang | H04N 21/42607 345/520 |

\* cited by examiner

*Primary Examiner* — Jaweed A Abbaszadeh
*Assistant Examiner* — Alyaa T Mazyad
(74) *Attorney, Agent, or Firm* — Trop Pruner & Hu, P.C.

(57) ABSTRACT

The graphics pipeline produces real time utilization data for each of a plurality of functional units making up an overall graphics processor or graphics system on a chip. This information may be used for fine grain management of power consumption and performance at the functional unit level as opposed the overall device level. As a result, the graphics functional units may be managed dynamically based on real time hardware metrics to improve performance and reduce power consumption. The technique may be implemented in a software module in one embodiment.

11 Claims, 5 Drawing Sheets

MANAGING GRAPHICS POWER CONSUMPTION AND PERFORMANCE

BACKGROUND

This relates generally to graphics processors.

Particularly, in connection with battery powered computing devices, it is desirable to reduce consumption of power to the greatest possible extent. Current solutions do coarse level power management by using dedicated microcontrollers or using assistance from operating systems. The power and performance management may be done at a system on a chip or graphics level.

BRIEF DESCRIPTION OF THE DRAWINGS

Some embodiments are described with respect to the following figures.

DETAILED DESCRIPTION

The graphics pipeline produces real time utilization data for each of a plurality of functional units making up an overall graphics processor or graphics system on a chip. This information may be used for fine grained management of power consumption and performance at the functional unit level as opposed the overall graphics device level. As a result, the graphics functional units may be managed dynamically based on real time hardware metrics to improve performance and reduce power consumption. The techniques may be implemented in a software module in one embodiment.

The graphics hardware is composed of many functional units such as compute units including shader cores and execution units. These units are arranged in modules with associated samplers. A sampler is a hardware functional unit that reads image data and applies different filtering techniques and other support functions.

The modules are independent units that can be grouped together to form a larger graphics compute structure to deliver higher performance.

The modules may be turned on and off at run time in order to improve performance versus power consumption. The decision whether to turn a module on or off may be based on usage metrics produced by the functional units within the module.

In one embodiment a software module that is part of a low level graphics driver running in ring zero privilege level in any operating system environment may be used to implement the techniques. This component is called a kernel mode driver.

Figure 1:
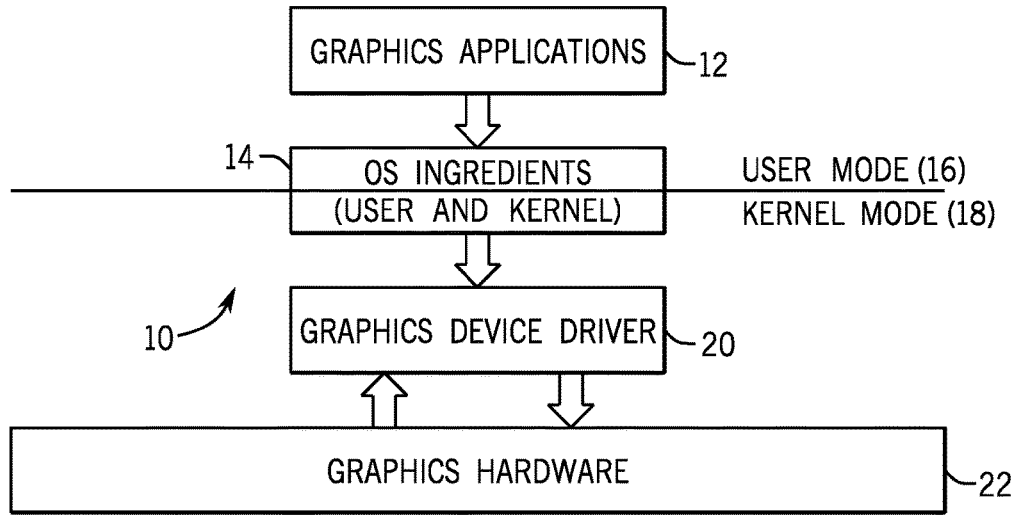
FIG. 1 depicts the user mode and kernel modes of a graphics system on a chip in accordance with one embodiment.

The kernel mode driver 10 shown in FIG. 1 runs in kernel mode 18 and receives inputs from graphics applications 12 in the user mode 16. The graphics application submits graphics workloads to the operating system ingredients 14, which are at both the user and the kernel levels. The operating system then submits the workload to the graphics device driver 20. The graphics device driver submits the workload to the graphics hardware 22. The hardware periodically updates the metrics to the graphics device driver 20. Based on the metrics, the graphics device driver decides what and how many and which hardware units to turn on and off and implements the appropriate decisions.

Figure 2:
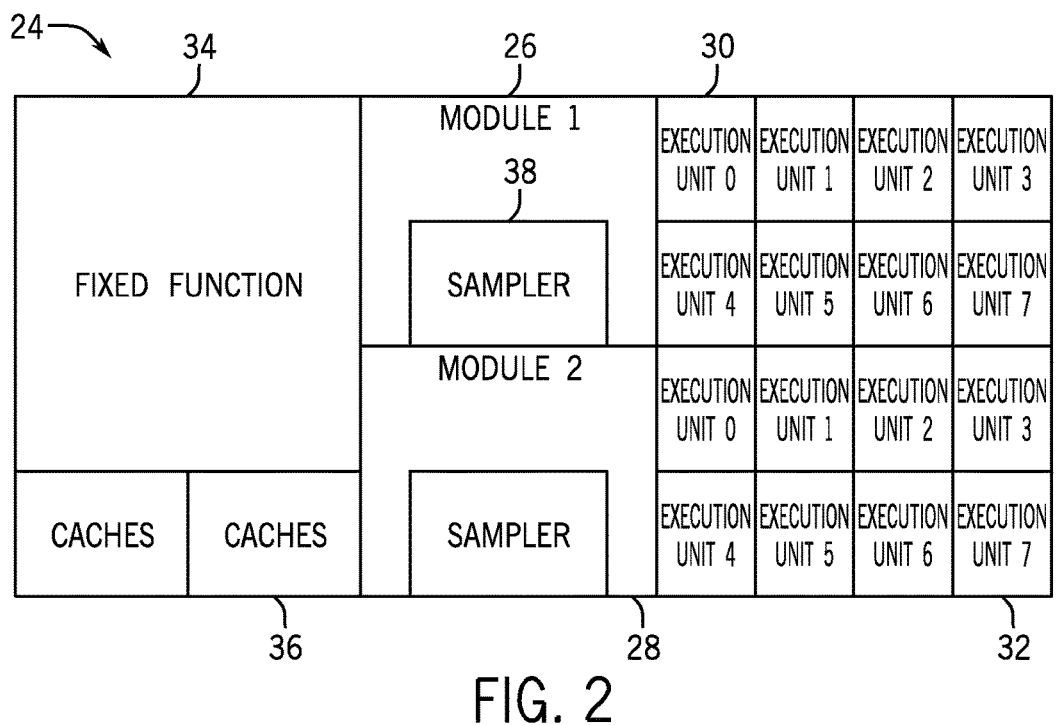
FIG. 2 is a high level diagram of modular functional units of the graphics hardware according to one embodiment.

A graphics hardware 24, such as a graphics processing unit or system on a chip, is depicted in FIG. 2. A fixed function unit 34 may be provided for two modules 26 and 28. The modules may also share caches 36.

The module 26, like the module 28, includes a sampler 38 and in this embodiment, eight execution units 30. The same architecture is provided in one embodiment for the module 28. More modules can be provided in some embodiments.

The fixed function unit 34 implements fixed functions for three-dimensional graphics processing in one embodiment. The execution units 30 and 32 are grouped into the modules 26 and 28. The graphics hardware 24 can be scaled with the addition of more functional units.

Thus, usage information at the functional unit level may be collated and combined to provide usage metrics to determine what modules should be turned on or off to improve power consumption or performance on a dynamic basis.

Figure 3:
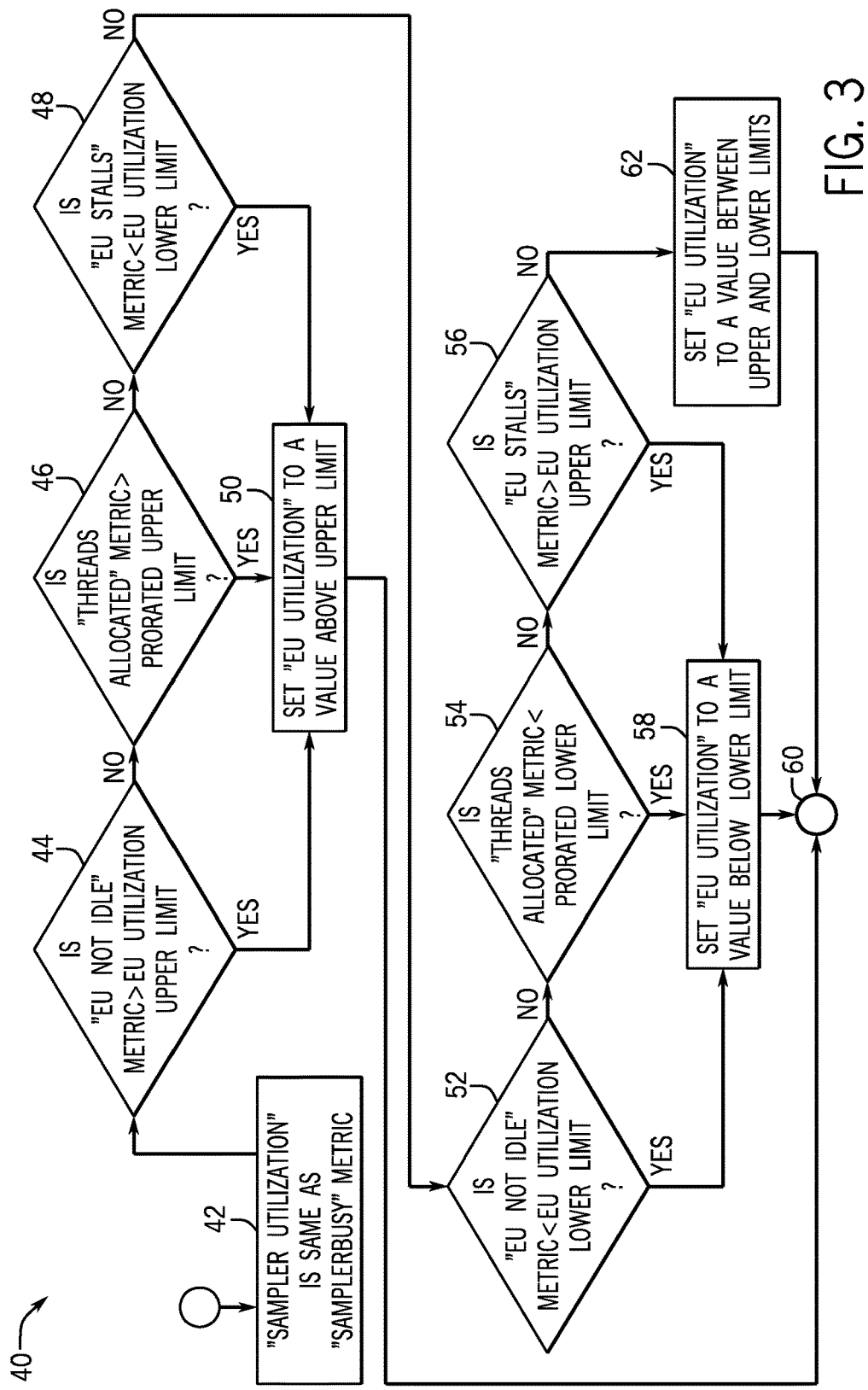
FIG. 3 is a flow chart for fine grained power management in a graphics device according to one embodiment.

The sequence 40, shown in FIG. 3, interprets the hardware metrics to derive usage parameters. The sequence may use various metrics from compute units such as number of active threads in execution units (active instruction execution indicator), stalled portion of execution units (time period during which execution unit is stalled for memory fetches), sampler busyness (busyness is a measure of utilization of the functional unit (in this case it is sampler), and execution unit busyness utilization (not idle) to derive consolidated parameters to feed into the decision-making process. An upper limit and a lower limit are tunable thresholds that may be used in some embodiments to improve performance and power consumption characteristics of the various graphics workloads. These thresholds help determine the degree of aggressiveness or slow-phased approach to turn on/off the functional units based on the consolidated utilization indicators.

The sequence 40, may be implemented in software, firmware and/or hardware. In software and firmware embodiments it may be implemented by computer executed instructions stored in one or more non-transitory computer readable media such as magnetic, semiconductor or optical storages. The sequence may be implemented by the graphics processing unit itself and particularly by the fixed function 34 shown in FIG. 2, as an example.

The sequence begins by determining at block 42 whether the sampler utilization is the same as a "sampler busy" metric. The sampler busy metric may be generated by the sampler to measure activity on the sampler. It may be defined as a percentage of sampler capacity. The sampler busy metric is simply a utilization indicator of how busy the sampler unit was.

Next, a check at diamond 44 determines whether the active execution busyness of execution units metric is greater than the execution unit utilization upper limit. In one embodiment, the execution unit busyness specifies how many execution units in a module are not idle ("EU not idle").

If not, a check at diamond 46 determines whether the number of allocated threads metric is greater than the prorated upper limit. The proration may be based on the number of active execution units. Finally, if not at diamond 48 a determination is made whether the number of execution unit stalls metric is less than the execution unit utilization lower limit. If the answer to any of these checks is 'yes', then the execution unit utilization for that execution unit is set to the value "above the upper limit" in block 50. This sequence may be repeated for each module.

In a case where one of the checks in diamonds 44, 46 or 48 is 'yes', then the flow proceeds to the summation point 60. In the case where all of them are 'no', the flow proceeds to diamond 52 to determine if the execution unit not idle metric, which indicates how many execution units are operating, is less than the execution utilization lower limit. If not, a check at diamond 54 determines whether the number of allocated threads metric is less than the prorated lower limit. If not, a check at diamond 56 determines if the execution unit stall metric is greater than the execution utilization upper limit.

If any of the checks in diamonds 52, 54 or 56 are 'yes' then the execution utilization value is set to a value "below lower limit" in block 58. If all the determinations in diamonds 52, 54 and 56 are 'no', then the execution utilization value is set to a value between upper and lower limits (block 62). This means there will be no changes made to turn on/off hardware functional units and the current state of hardware will remain the same.

Figure 4:
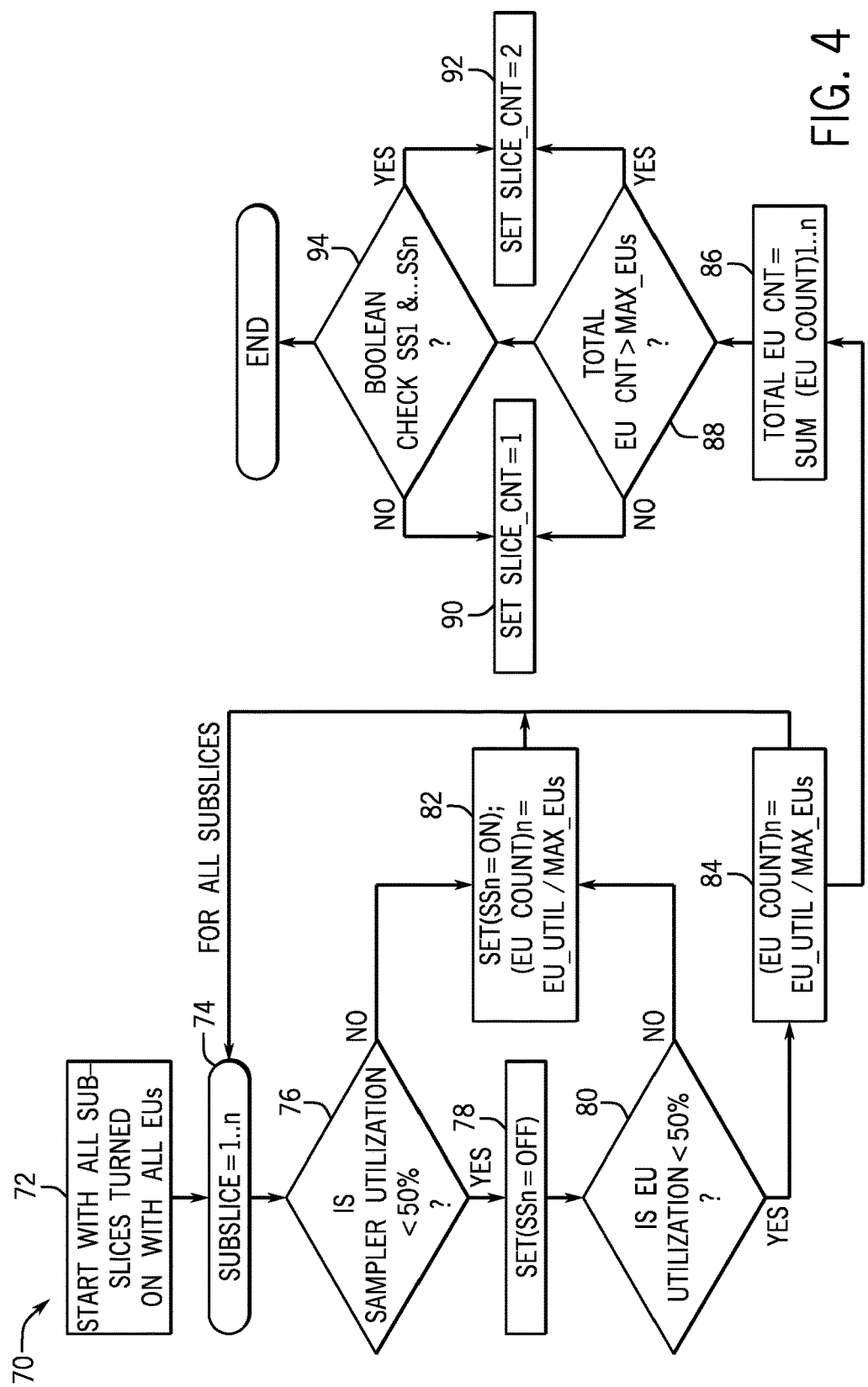
FIG. 4 is a flow chart for implementing a power management decision according to one embodiment.

FIG. 4 shows a sequence for implementing the determinations made in sequence of FIG. 3. Based on the derived usage parameters, the sequence 70 of FIG. 4 determines a set of functional units that actually will operate in any given instant within the graphics hardware.

The sequence 70 may be implemented in software, firmware and/or hardware. In software and firmware embodiments it may be implemented by computer executed instructions stored in one or more non-transitory computer readable media such as magnetic, optical or semiconductor storage. In some embodiments it may be implemented within the graphics processor or the graphics system on a chip and particularly it may be implemented in some embodiments by the fixed function 34 shown in FIG. 2.

At system start-up and any other reset events, all the modules (sub-slices) and all their execution units are turned on (block 72). In one embodiment, there are two modules, such as the modules 26 and 28 of FIG. 2. However, more modules may be used in some cases.

Periodically, the utilization data is read and each of the steps shown in FIG. 4 is performed for each module. Since each module has a sampler in one embodiment, if the sampler utilization is less than 50% as determined at diamond 76, this means that the module can be turned off. The revised number of execution units for this module can then be calculated using the execution utilization percentage prorated against the maximum number of execution units per module. For example 50% execution utilization means that only half the maximum number of execution units need to be powered up for this module. Other values can also be used.

Based on the individual module utilization analysis outcome, the final numbers are derived based on limitations with the current hardware (such as the number of execution units per module can only be set to be the same value for all modules) and the newly calculated values are programmed into the hardware in one embodiment. This sequence can be run periodically to provide better performance and less power consumption.

Thus in FIG. 4 the sequence 70 starts with all of the modules (subslices) and all the execution units turned on as indicated in block 72. Then the first module is selected at 74.

A check at diamond 76 determines whether the sampler utilization (FIG. 3, block 42) for that module is less than 50%. If so, the module is turned off at block 78. Then a check at diamond 80 determines if the execution unit utilization is now less than 50%. If so, the execution unit count is reset, as indicated in block 84 to account for any modules that were just turned off. If the check at either diamond 76 or 80 is 'no', then the module is left on and the execution unit count is unchanged (block 82). Then the flow goes back to check the next module at 74.

After the execution unit count has been reset for each module in block 84, then at block 86, the total execution unit count is set equal to the summation of the results of all modules. A check at diamond 88 determines whether the total execution unit count is greater than the maximum number of execution units. If so, the module count is set equal to 2 at block 92. If not, the module count is set to 1 at block 90. If only one module is to be used, the count is set to one and if both modules are active (in an example with two modules), the module count is set to two). Based on execution unit utilization in each module, the number of active modules can be reduced to reduce power consumption.

Regardless of the result at diamond 88, a parallel path goes to diamond 94 to do a Boolean check of the number of modules. The fixed function unit 34 of FIG. 2 can use the determinations of FIG. 4 to decide whether to operate both modules 26 and 28 in one embodiment.

Figure 5:
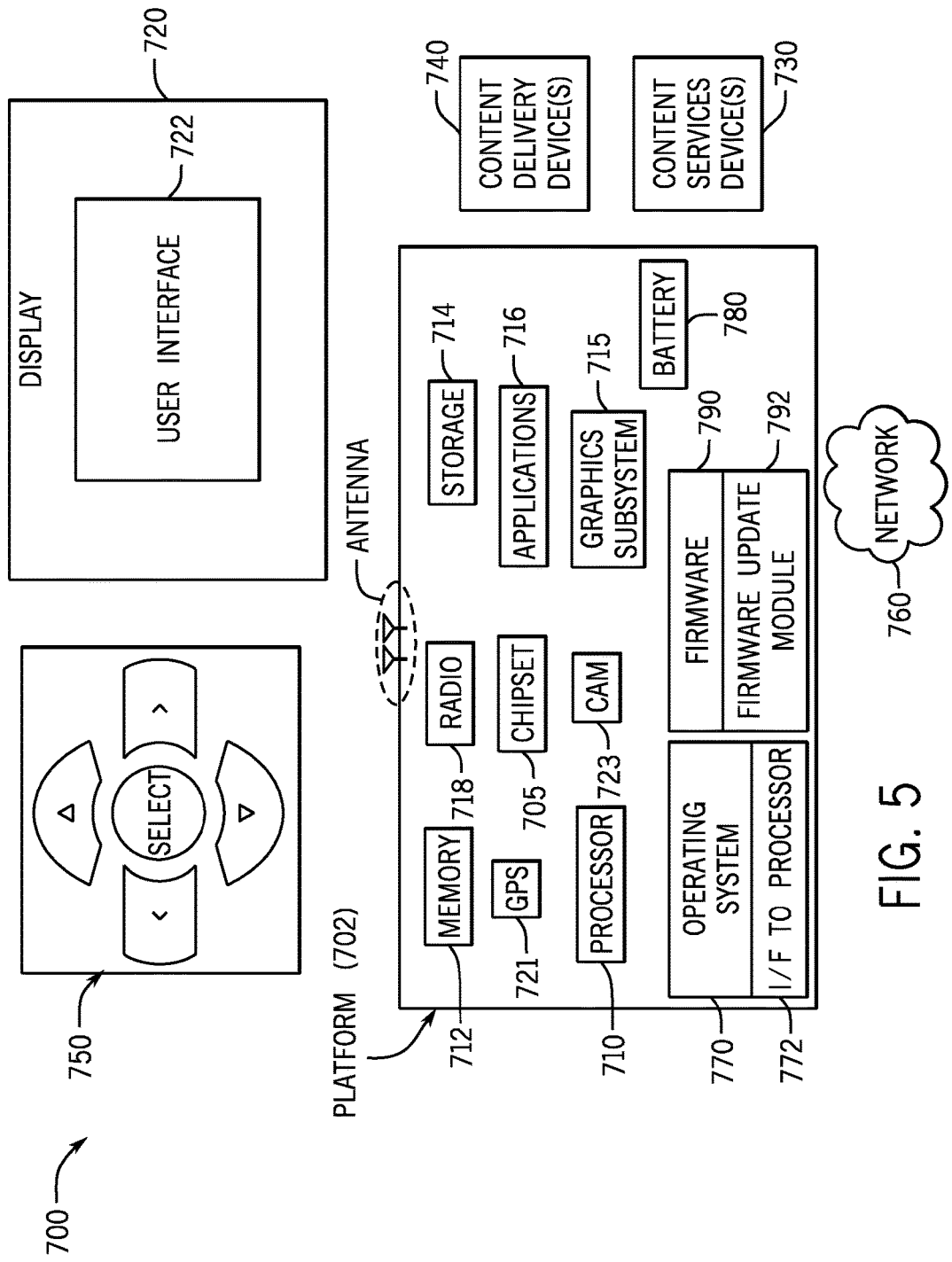
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 3 and 4, together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
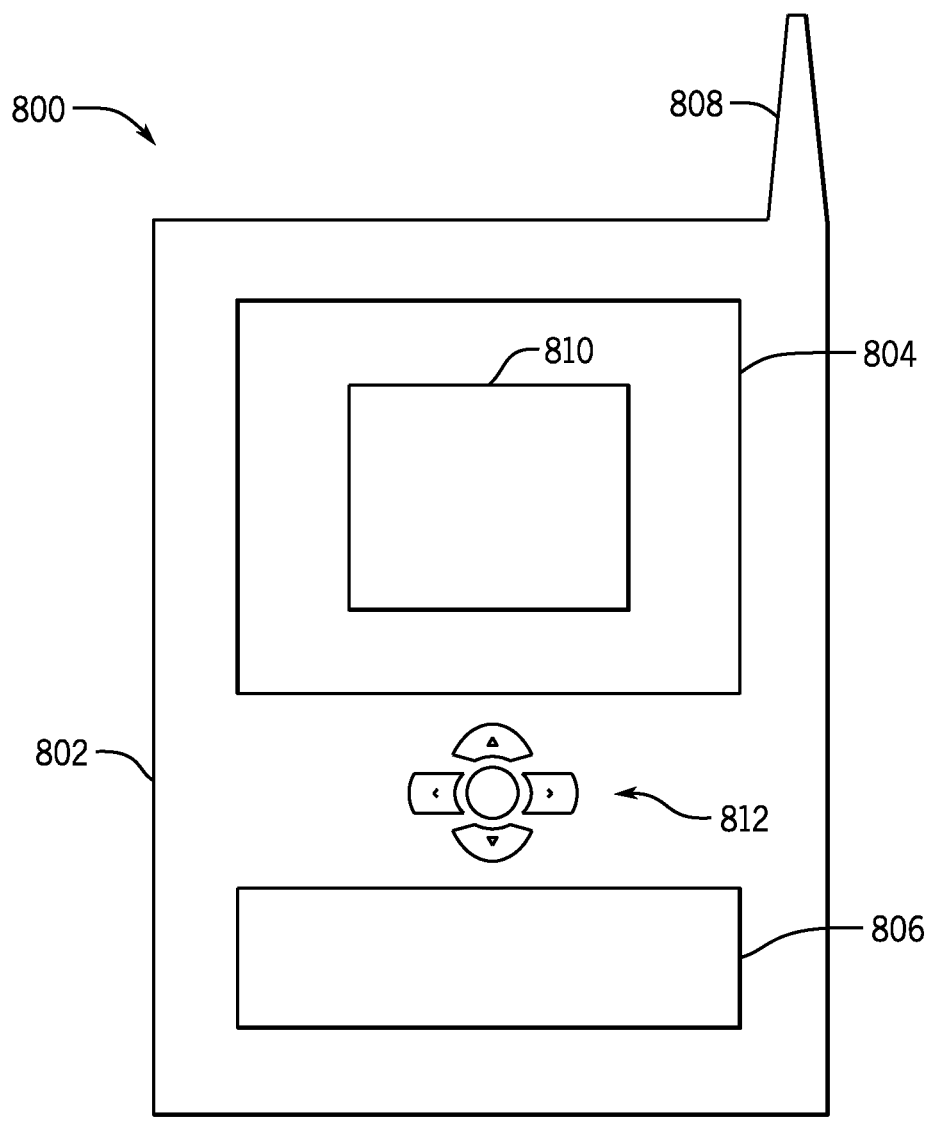
FIG. 6 is a front elevational view of one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 3 in software and/or firmware embodiments.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising receiving real time utilization metrics for each of a plurality of functional units of a graphics device, determining whether a functional unit's metrics are above or below at least one threshold, and based on the utilization metrics deciding whether to turn on or off each of the plurality of functional units. The method may also include wherein said metrics include one or more of a number of allocated threads, number of execution unit stalls, and number of active execution units. The method may also include determining whether a metric exceeds an upper limit threshold. The method may also include determining whether the utilization metric is below a lower limit threshold. The method may also include turning off underutilized functional units. The method may also include determining a number of operating functional units. The method may also include determining what percentage of functional units are operating. The method may also include determining how busy a sampler is.

In another example, one or more non-transitory computer readable media storing instructions for execution to perform a sequence comprising receiving real time utilization metrics for each of a plurality of functional units of a graphics device, determining whether a functional unit's metrics are above or below at least one threshold, and based on the utilization metrics deciding whether to turn on or off each of the plurality of functional units. The media may also include wherein said metrics include one or more of a number of allocated threads, number of execution unit stalls, and number of active execution units. The media may also include determining whether a metric exceeds an upper limit threshold. The media may also include determining whether the utilization metric is below a lower limit threshold. The media may also include turning off underutilized functional units. The media may also include determining a number of operating functional units. The media may also include determining what percentage of functional units are operating. The media may also include determining how busy a sampler is.

Another example embodiment may be a graphics device comprising a plurality of functional units to generate real time utilization metrics, and a processor to determine whether a functional unit's metrics are above or below at least one threshold and, based on the utilization metrics, decide whether to turn on or off each of the plurality of functional units. The device may include one or more of a number of allocated threads, number of execution unit stalls, and number of active execution units. The device may include said processor to determine whether a metric exceeds an upper limit threshold. The device may include said processor to determine whether the utilization metric is below a lower limit threshold. The device may include said processor to turn off underutilized functional units. The device may include said processor to determine a number of operating functional units. The device may include said processor to determine what percentage of functional units are operating. The device may include said processor to determine how busy a sampler is. The device may include an operating system. The device may include a battery. The device may include firmware and a module to update said firmware.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   receiving in a hardware processor utilization metrics for a first and second functional units of one of at least two identical modules of a graphics processing unit, said first and second functional units being non-identical; and
   determining functional unit utilization in said processor by:
   determining if a number of active functional units is below a first threshold;
   if not, determining if a number of allocated threads is below a second threshold set based on the number of active functional units;
   if not, determining if the number of functional unit stalls is above a third threshold;
   identifying underutilized functional units using the utilization metrics; and
   turning off underutilized functional units.

2. The method of claim 1 including determining how busy a sampler is.

3. One or more non-transitory computer readable media storing instructions for execution to perform a sequence comprising:
   receiving in a hardware processor utilization metrics for a first and second functional units of one of at least two identical modules of a graphics processing unit, said first and second functional units being non-identical; and
   determining functional unit utilization in said processor by:
   determining if a number of active functional units is below a first threshold;
   if not, determining if a number of allocated threads is below a second threshold set based on the number of active functional units;
   if not, determining if the number of functional unit stalls is above a third threshold;
   identifying underutilized functional units using the utilization metrics; and
   turning off underutilized functional units.

4. The media of claim 3, said sequence including determining how busy a sampler is.

5. A graphics processing unit comprising:
   a plurality of functional units to generate real time utilization metrics for a first and second functional unit of one of at least two identical modules; and
   a processor to determine functional unit utilization in a processor by determining if a number of active functional units is below a first threshold, if not, determine if a number of allocated threads is below a second threshold set based on the number of active functional units, and if not, determine if the number of functional unit stalls is above a third threshold, identify underutilized functional units using the utilization metrics; and turn off underutilized functional units.

6. The device of claim 5, said processor to determine a number of operating functional units.

7. The device of claim 6, said processor to determine what percentage of functional units are operating.

8. The device of claim 5, said processor to determine how busy a sampler is.

9. The device of claim 5 including an operating system.

10. The device of claim 5 including a battery.

11. The device of claim 5 including firmware and a module to update said firmware.

* * * * *